May 11, 1943.  P. DI LEMME  2,319,045
QUIZ GAME
Filed April 18, 1942
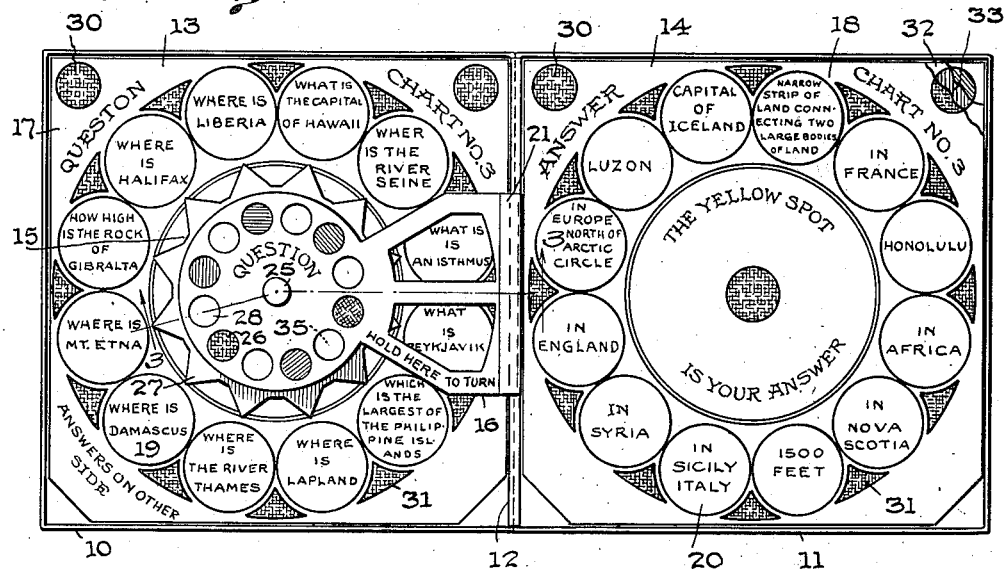
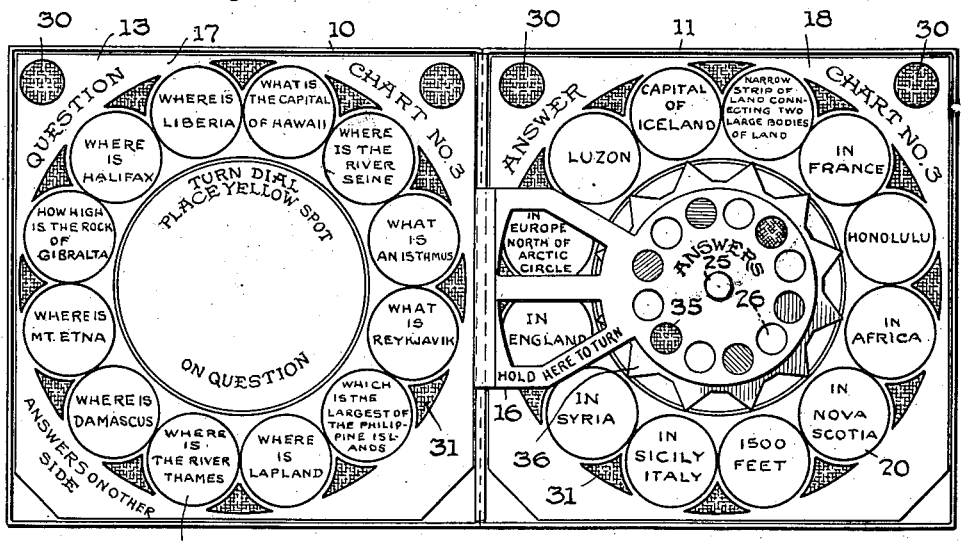
INVENTOR.
Philip Di Lemme
BY Patented May 11, 1943

2,319,045

UNITED STATES PATENT OFFICE 2,319,045

QUIZ GAME

Philip Di Lemme, New York, N. Y.

Application April 18, 1942, Serial No. 439,609

4 Claims. (Cl. 35—74)

The present invention relates to quiz games of the general type in which the movement of an indicator to any one of a plurality of question indicia results automatically in causing an answer indicator element to come into indicating position relative to the correct answer, selecting the latter out of a plurality of answer indicia.

An important object of the invention is the provision of a device whereby a common indicating system or mechanism may be used for a plurality of sets or pairs of question and answer charts with variation of the relative positions of questions and answers for different sets or pairs of charts whereby familiarity with the relative position of answers and questions for one set of charts will not afford a key to such relative positions in another set of charts.

Another object of the invention is to provide a question and answer device of the above type of extremely simple and sturdy construction and which may be made substantially wholly of non-metallic and relatively inexpensive material such as cardboard or partly of cardboard and wood or plastics and the like.

Various other objects and advantages of the invention will become apparent from a perusal of the following specification and the drawing accompanying the same.

In the drawing

Figure 1 is a top plan view of the device with the parts in the questioning position.

Figure 2 is a similar view with the parts in answering position.

Figure 3 is an enlarged fragmentary section on the line 3—3 of Figure 1.

The device consists in general of a foldable casing comprised of a pair of tray-like box elements, one a question box element 10 and the other an answer box element 11 arranged upwardly facing and juxtaposed side by side with their juxtaposed sides hinged together preferably by a flexible, cloth hinge element 12 so that the two box elements 10 and 11 may be swung about the hinge 12 and brought together to form a closed casing for the device. A plurality of sets or pairs of question and answer leaves 13 and 14 are arranged to be positioned within the question and answer boxes for cooperation with a common indicating device comprising an indicator dial 15 carried by a hinged dial support 16 arranged to be flapped over from one side to the other to bring an indicator into cooperative relation with either the question chart 17 or the answer chart 18 printed or otherwise formed on the surfaces of the question and answer leaves 13 and 14.

Referring to the parts more in detail, the question and answer leaves 13 and 14 are provided with question and answer charts 17 and 18, respectively, printed or otherwise applied thereto, the question chart 17 bearing a circular group of question indicia 19 while the answer chart bears a similar circular group of indicia in the form of inscriptions constituting answers relative to the questions on the question chart. The dial support 16 is hingedly connected between the question and answer boxes along their line of juxtaposition by means of flexible hinge elements 21, and so arranged as to lie in a position concentric with the circular arrangement of question and answer indicia in either box when flapped over from one to the other in the different positions shown in Figures 1 and 2.

The hinged dial support 16 is constructed of suitable sheet material preferably cardboard and consists of a pair of spaced side elements 22 and 23 spaced apart by a spacer element 24 to receive between them the indicator dial 15 mounted therebetween on a suitable pivot element 25. The indicator dial is provided on each side with a plurality of indicator elements such as the element 26 (Fig. 1), and 35 (Fig. 2), consisting of a colored disc printed on the indicator dial arranged to be visible through correspondingly spaced window openings 28 in the dial support 16 and each provided with a pointer extension 27. Such indicator elements are provided in related pairs, one of a pair on each side of the dial 15, the opposite indicators of a pair being identified by being of the same color with a different color for different pairs.

To identify a set of charts with its proper set of indicators, such charts are given a color-code index in the form of a colored disc 30 which in the present example is yellow in color so as to identify the charts shown as requiring the use of the yellow indicator. Instead of or in addition to the use of a color code index such as 30, a related pair of charts may be identified by having other portions in such distinguishing color such as the decorative elements 31, here shown as yellow. It is to be understood, of course, that instead of color, any other means of identification may be used for a related set of charts and indicator as by the use of letters and numerals, for example, the charts of a given kind or arrangement for use with a given indicator may be identified by a letter and the particular set of charts by a number because there may be several sets of charts using the one indicator.

To render more difficult the knowledge of a position assumed by one indicator relative to the other, the indicators of a pair are angularly disposed in relation to each other, for example in Figure 1 the yellow indicator element 26 there shown as pointing to the question "Where is Damascus?" is angularly displaced with respect to the other yellow indicator 35 (Fig. 2) on the other side which latter is pointed to the answer "In Syria." Another factor in this element of surprise or uncertainty, as to the position to be assumed by the answer indicator on the answer chart is the fact that when the dial is flapped over from one chart to the other, the angular relation of the various parts of the dial to the charts is reversed with respect to the perpendicular passing through the pivot 25. In other words the angular relation of the parts in the answering position becomes a mirrored image of their angular relation in the questioning position. Thus in the case of the yellow indicators 26 and 35, where the question indicator 26 is separated three spaces from the answer indicator 35, when the dial support is swung over onto the answer chart the yellow answer indicator will assume a position three spaces clockwise from the mirrored image of the position which was assumed by the question indicator in the questioning position. From this it will be clear that it would be quite difficult for the average person to figure out in advance what will be the position of the indicator when the dial support is flapped over. To prevent familiarity with one set of indicators and charts from aiding in ascertaining the answer without knowledge of the subject, the angular displacement of the different pairs of indicators is different. For example the blue indicators marked B on Figures 1 and 2 are displaced one space while the green indicators marked G are displaced four spaces. Thus, the angular relation between the questions and answers of a set of blue charts will be different from that of a set of yellow charts, and the pair of indicators arranged for use with one set of charts will not cooperate with a set of charts arranged for cooperation with a different set of indicators.

The leaves are preferably made of rectangular pieces of light cardboard to enable several leaves to be packed in either of the question and answer boxes and by printing, or otherwise forming, a chart on both sides of each leaf the number of sets of question and answer charts may be double that of the number of pairs of leaves. For example, the leaf 14 bearing on its upper face the answer chart No. 3 may also carry on the opposite side another question chart, say No. 4, so that when flapped over into the question box 10 a new question chart will be presented therein and its corresponding answer chart presented on the face of another leaf 32 (Fig. 1) having a different color code index as indicated by the red colored disc 33 on the new answer chart. Thus, with several sets of question and answer charts a wide field of subjects may be covered, the question and answer boxes 10 and 11 being capable of storing several sets of charts in a pack as indicated at 34 in Figure 3.

In operation, the user turns the indicator dial 15 and with it the question indicator 26 having the key color of the chart beng used, in the present instance yellow, until the pointer element 26 of that indicator points to one of the questions on the question chart, for example "Where is Damascus?" Then to ascertain the correct answer to this question the user takes hold of the hinged dial support 16, preferably at the portion bearing the legend "Hold here to turn" and flaps the dial over onto the answer chart 14, as shown in Figure 2 of the drawings. Here it will be seen that the yellow answer indicator 35 and its associated pointer element 36 now points to the inscription "In Syria." Similarly all the other questions on the question chart 13 may be answered by moving the yellow question indicator to any of them and then flapping the dial over to the answer chart 14.

It will be understood, of course, that while seven different key colors are here used giving seven different kinds of sets of charts with different codes as to the angular displacement between the questions and answers, an indefinite number of such different kinds or codes may be used.

While I have herein shown and described one specific embodiment of my invention for the sake of disclosure it is to be understood that the invention is not limited to such specific embodiment but contemplates all such modifications and variations thereof as fall fairly within the scope of the appended claims.

What is claimed is:

1. In a quiz game, the combination of a pair of question and answer charts each bearing a series of related question and answer indicia, a dial support hingedly mounted between the said charts for movement into superposition on either chart, an indicator common to both said question and answer charts movably mounted on said support, and question and answer indicator pointer elements fixed on said indicator and movable with the indicator in fixed relation to each other for cooperation with the question and answer charts, respectively.

2. In a quiz game, the combination of a question chart and an answer chart, bearing a circular series of related question and answer indicia, respectively, an indicator support common to both said question and answer charts arranged to be flapped over from overlapping relation with one chart to the other, question and answer indicators mounted to rotate together in fixed relation to each other on said support each obscured from the opposite side of the support.

3. In a quiz game, the combination of a question chart and an answer chart, bearing a series of related question and answer indicia, respectively, an indicator support common to both said question and answer charts arranged to be flapped over from overlapping relation with one chart to the other, question and answer indicators mounted to rotate together in fixed relation to each other on said support each obscured from the opposite side of the support, said question and answer indicators being angularly displaced with respect to each other together with other pairs of question and answer indicators mounted on said indicator support, similarly arranged with respect to other sets of charts, the different pairs of indicators having different angular displacements.

4. In a quiz game, the combination of a question chart and an answer chart, bearing a circular series of related question and answer indicia, respectively, an indicator support common to both said question and answer charts arranged to be flapped over from overlapping relation with one chart to the other, question and answer indicators mounted to rotate together in fixed relation to each other on said support each obscured from the opposite side of the support, said question and answer indicators being angularly displaced with respect to each other together with other pairs of question and answer indicators mounted on said indicator support, similarly arranged with respect to other sets of charts, the different pairs of indicators having different angular displacements, each pair of indicators and its associated charts bearing common identifying indicia.

PHILIP DI LEMME.